(12) United States Patent
Querel et al.

(10) Patent No.: US 8,784,521 B2
(45) Date of Patent: Jul. 22, 2014

(54) BONDED ABRASIVE ARTICLE AND METHOD OF FORMING

(75) Inventors: Gilles Querel, Compiegne (FR);
Sandhya Jayaraman Rukmani, Worcester, MA (US); Muthu Jeevanantham, Worcester, MA (US); Kelley McNeal, Marlborough, MA (US); Stephen E. Fox, Worcester, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 456 days.

(21) Appl. No.: 12/959,273

(22) Filed: Dec. 2, 2010

(65) Prior Publication Data
US 2011/0131888 A1 Jun. 9, 2011

Related U.S. Application Data

(60) Provisional application No. 61/266,041, filed on Dec. 2, 2009.

(51) Int. Cl.
*B24D 3/00* (2006.01)
*B24D 3/14* (2006.01)

(52) U.S. Cl.
USPC ............................................... 51/309; 51/307

(58) Field of Classification Search
None
See application file for complete search history.

(56) References Cited

U.S. PATENT DOCUMENTS

| 4,314,827 | A | * | 2/1982 | Leitheiser et al. ............... 51/298 |
| 4,543,107 | A | * | 9/1985 | Rue ................................. 51/309 |
| 4,623,364 | A | | 11/1986 | Cottringer et al. |
| 4,898,597 | A | | 2/1990 | Hay et al. |
| 4,944,773 | A | * | 7/1990 | Rue et al. .......................... 51/307 |
| 4,997,461 | A | | 3/1991 | Markhoff-Matheny et al. |
| 5,037,452 | A | | 8/1991 | Gary et al. |
| 5,090,970 | A | | 2/1992 | Rue et al. |
| 5,131,923 | A | | 7/1992 | Markhoff-Matheny et al. |
| 5,203,886 | A | | 4/1993 | Sheldon et al. |
| 5,244,477 | A | | 9/1993 | Rue et al. |
| 5,401,284 | A | | 3/1995 | Sheldon et al. |
| 5,536,283 | A | | 7/1996 | Sheldon et al. |
| 5,672,185 | A | | 9/1997 | Ryoke |

(Continued)

FOREIGN PATENT DOCUMENTS

| CN | 1420100 A | 5/2003 |
| CN | 1509843 A | 7/2004 |

(Continued)

OTHER PUBLICATIONS

PCT Application No. PCT/US2010/058783, Filed Dec. 2, 2010 "Notification of Transmittal of the International Search Report and The Written Opinion of the International Searching Authority, or the Declaration", dated Aug. 19, 2011, 10 pages.

(Continued)

*Primary Examiner* — Kaj K Olsen
*Assistant Examiner* — Jared Wood
(74) *Attorney, Agent, or Firm* — Abel Law Group, LLP; Joseph P. Sullivan

(57) ABSTRACT

An abrasive article includes an abrasive body having abrasive grains within a bond material, the abrasive body further including a spinel material disposed at an interface between the abrasive grains and the bond matrix.

19 Claims, 5 Drawing Sheets

(56) References Cited

U.S. PATENT DOCUMENTS

| | | | |
|---|---|---|---|
| 5,863,308 A | 1/1999 | Qi et al. | |
| 5,975,988 A * | 11/1999 | Christianson | 451/28 |
| 6,066,189 A | 5/2000 | Meyer et al. | |
| 6,086,648 A | 7/2000 | Rossetti, Jr. et al. | |
| 6,287,353 B1 | 9/2001 | Celikkaya | |
| 6,500,220 B1 | 12/2002 | Krueger et al. | |
| 6,592,640 B1 | 7/2003 | Rosenflanz et al. | |
| 6,702,867 B2 | 3/2004 | Carman et al. | |
| 2003/0045221 A1 | 3/2003 | Li et al. | |
| 2003/0194947 A1 | 10/2003 | Bright et al. | |
| 2003/0236062 A1 | 12/2003 | Li et al. | |
| 2005/0183407 A1 | 8/2005 | Hayward et al. | |
| 2006/0196123 A1 | 9/2006 | Marlin | |
| 2008/0222967 A1 * | 9/2008 | Querel et al. | 51/308 |
| 2011/0083374 A1 * | 4/2011 | Querel et al. | 51/308 |
| 2011/0131888 A1 | 6/2011 | Querel et al. | |
| 2011/0131889 A1 | 6/2011 | Querel et al. | |

FOREIGN PATENT DOCUMENTS

| | | |
|---|---|---|
| DE | 3346772 A1 | 9/1985 |
| EP | 0152768 A2 | 8/1985 |
| JP | H03-205475 A | 9/1991 |
| JP | H05-163060 A | 6/1993 |
| JP | H06-86326 B2 | 11/1994 |
| JP | H06-335866 A | 12/1994 |
| JP | H07-16882 B2 | 3/1995 |
| JP | H08-39434 A | 2/1996 |
| JP | H08-505175 A | 6/1996 |
| JP | 2001-260032 A | 9/2001 |
| JP | 2002522636 A | 7/2002 |
| JP | 2003-521577 A | 7/2003 |
| JP | 2006-247837 A | 9/2006 |
| JP | 2007-231287 A | 9/2007 |
| JP | 2000-280175 A | 10/2010 |
| JP | 2013-507260 A | 3/2013 |
| JP | 2013-512114 A | 4/2013 |
| JP | 2013-512115 A | 4/2013 |
| WO | 94/14722 A1 | 7/1994 |
| WO | 00/08219 A1 | 2/2000 |
| WO | 2000035632 A2 | 6/2000 |
| WO | 01/14495 A1 | 3/2001 |
| WO | 2008079680 A1 | 3/2008 |

OTHER PUBLICATIONS

PCT Application No. PCT/US2010/052051, Filed Oct. 8, 2010 "Notification of Transmittal of the International Search Report and The Written Opinion of the International Searching Authority, or the Declaration", dated Jun. 3, 2011, 10 pages.

PCT Application No. PCT/US2010/058782, Filed Dec. 2, 2010 "Notification of Transmittal of the International Search Report and The Written Opinion of the International Searching Authority, or the Declaration", dated Aug. 17, 2011, 10 pages.

U.S. Appl. No. 12/959,282, filed Dec. 2, 2010, Inventors: Gilles Querel et al.

U.S. Appl. No. 12/901,218, filed Oct. 8, 2009, Inventors: Gilles Querel et al.

* cited by examiner

BONDED ABRASIVE ARTICLE AND METHOD OF FORMING

CROSS-REFERENCE TO RELATED APPLICATION(S)

The present application claims priority from U.S. Provisional Patent Application No. 61/266,041, filed Dec. 2, 2009, entitled "BONDED ABRASIVE ARTICLE AND METHOD OF FORMING," naming inventors Gilles Querel, Sandhya Jayaraman Rukmani, Muthu Jeevanantham, Kelley McNeal, and Stephen E. Fox, which application is incorporated by reference herein in its entirety.

BACKGROUND

1. Field of the Disclosure

The following is directed to bonded abrasives and particularly bonded abrasive articles incorporating microcrystalline alumina abrasive grains.

2. Description of the Related Art

Abrasive tools are generally formed to have abrasive grains contained within a bond material for material removal applications. Superabrasive grains (e.g., diamond or cubic boron nitride (CBN)) or seeded (or even unseeded) sintered sol gel alumina abrasive grain, also referred to microcrystalline alpha-alumina (MCA) abrasive grain, can be employed in such abrasive tools and are known to provide superior grinding performance on a variety of materials. The bond material can be organic materials, such as a resin, or an inorganic material, such as a glass or vitrified material. In particular, bonded abrasive tools using a vitrified bond material and containing MCA grains or superabrasive grain are commercially useful for grinding precision metal parts and other industrial components requiring consistent and improved grinding performance.

Certain bonded abrasive tools, particularly those utilizing a vitrified bond material, require high temperature forming processes, which can have deleterious effects on the abrasive grains. In fact, it has been recognized that at such elevated temperatures necessary to form the abrasive tool, the bond material can react with the abrasive grains, particularly MCA grains, damaging the integrity of the abrasive, reducing the grain sharpness and performance properties. As a result, the industry has migrated toward reducing the formation temperatures necessary to form the bond material in order to curb the high temperature degradation of the abrasive grains during the forming process.

For example, to reduce the amount of reaction between MCA grain and vitrified bond, U.S. Pat. No. 4,543,107 discloses a bond composition suitable for firing at a temperature as low as about 900° C. In an alternate approach, U.S. Pat. No. 4,898,597 discloses a bond composition comprising at least 40% fritted materials suitable for firing at a temperature as low as about 900° C. Other such bonded abrasive articles utilizing bond materials capable of forming at temperatures below 1100° C., and in fact, below 1000° C., include U.S. Pat. Nos. 5,203,886, 5,401,284, 5,536,283, and 6,702,867. Still, the industry continues to demand improved performance of such bonded abrasive articles.

SUMMARY

According to a first aspect, an abrasive article has an abrasive body including abrasive grains within a bond material, the abrasive body further including a spinel material disposed at an interface between the abrasive grains and the bond matrix.

According to another aspect, an abrasive article has an abrasive body including abrasive grains contained within a matrix of bond material, the abrasive body further including a layer comprising a spinel material overlying an exterior surface of the abrasive grains.

In yet another aspect, an abrasive article includes an abrasive body having abrasive grains comprising microcrystalline aluminum oxide contained within a bond material comprising a vitreous phase, the abrasive grains having a layer of material overlying an exterior surface of the abrasive grains, wherein the layer includes a spinel material.

Another aspect includes an abrasive article comprising a bonded abrasive body having a first set of abrasive grains including microcrystalline aluminum oxide contained within a vitreous bond material, wherein the bonded abrasive body further includes a passivation region surrounding at least a portion of the abrasive grains, the passivation region comprising a spinel material having the general chemical composition of $AB_2O_4$, wherein A represents a first element, B represents a second element different than A, and O is oxygen.

According to another aspect, an abrasive article includes an abrasive body having abrasive grains comprising microcrystalline aluminum oxide and a layer comprising a spinel material overlying at least a portion of an exterior surface of the abrasive grains. The abrasive body further includes a bond material formed from a composition including a sufficient amount of a spinel-forming material selected from the group of oxides consisting of magnesium oxide, zinc oxide, iron oxide, manganese oxide, and combination thereof.

In still another aspect, a method of forming an abrasive article includes mixing abrasive grains with a bond material powder, forming the mixture to form a green body, and treating the green body to form an abrasive article comprising abrasive grains in a bond material, wherein during treating a passivation region comprising a spinel material is formed around the abrasive grains.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is generally directed to an abrasive article, particularly a bonded abrasive article utilizing abrasive grains contained within a bond material. Such abrasive articles are useful in material removal applications, such as those in various industries for finishing and/or grinding workpieces. The abrasive articles can be shaped and sized to make various finishing tools, such as wheels, cones, cup-shaped articles, hones, and/or stones.

Figure 1:
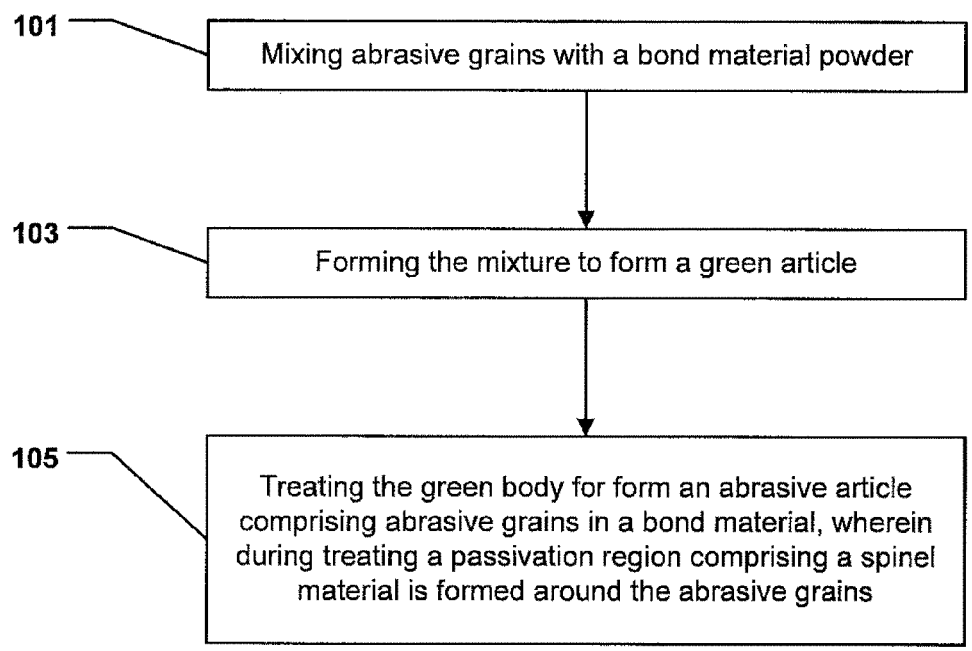
FIG. 1 includes a flow chart illustrating a method of forming an abrasive article in accordance with an embodiment.

FIG. 1 includes a flow chart illustrating a method of forming an abrasive article in accordance with an embodiment. As illustrated, the process is initiated at step 101 by mixing abrasive grains with a bond material powder. In accordance with an embodiment, the abrasive grains can include an inorganic material, such as an oxide. More particularly, the abrasive grains can include microcrystalline alumina (MCA) grains.

The MCA or sol-gel alumina grains are preferably produced by either a seeded or an unseeded sol-gel process. As used herein, the term "sol-gel alumina grits" are alumina grits made by a process comprising peptizing a sol of an aluminum oxide monohydrate so as to form a gel, drying and firing the gel to sinter it, and then breaking, screening, and sizing the sintered gel to form polycrystalline grains made of alpha alumina microcrystals (e.g., at least about 95% alumina). In addition to the alpha alumina microcrystals, the initial sol may further include up to 15% by weight of spinel, mullite, manganese dioxide, titania, magnesia, rare earth metal oxides, zirconia powder or a zirconia precursor (which can be added in larger amounts, e.g. 40 wt % or more), or other compatible additives or precursors thereof. These additives are often included to modify such properties as fracture toughness, hardness, friability, fracture mechanics, or drying behavior. Preparation of sintered sol gel alpha-alumina grains is described in detail elsewhere. Details of such preparations may be found, for example, in U.S. Pat. Nos. 4,623,364, 4,314,827, and 5,863,308, the contents of which are hereby incorporated by reference.

The term MCA grain is defined to include any grain comprising at least 60% alpha alumina microcrystals having at least 95% theoretical density and a Vickers hardness (500 grams) of at least 18 GPa at 500 grams. The sintered sol gel alpha-alumina grain may contain platelets of material other than alpha-alumina dispersed among the alpha-alumina microcrystals. Generally, the alpha-alumina particles and the platelets are submicron in size when made in this form. Further details of MCA abrasive grain preparations and MCA abrasive grain types useful in the present invention may be found in any one of the numerous other patents and publications, which cite the basic technology disclosed in the U.S. Pat. Nos. 4,623,364 and 4,314,827.

The microcrystalline alumina utilized in the abrasive grains can have an average crystallite size of less than 1 micron. In fact, in certain instances, the microcrystalline alumina can have an average crystallite size of less than about 0.5 microns, and particularly within a range between about 0.1 and about 0.2 microns.

Additionally, it will be appreciated that the bonded abrasive articles of embodiments herein may utilize a certain content of secondary abrasive grains. When secondary abrasive grains are used, such abrasive grains can provide from about 0.1 to about 97 vol % of the total abrasive grain of the tool, and more preferably, from about 30 to about 70 vol %.

The secondary abrasive grains which may be used include, but are not limited to, alumina oxide, silicon carbide, cubic boron nitride, diamond, flint and garnet grains, and combinations thereof. As such, certain abrasive articles herein may utilize a mixture of abrasive grains such that the abrasive article comprises a first portion of abrasive grains made of MCA and a second portion of abrasive grains selected from the group of materials consisting of superabrasive grains, monocrystalline alumina, and a combination thereof.

In reference to the bond material powder, inorganic materials may be utilized, and in particular, inorganic materials that facilitate the formation of a final-formed abrasive article having a vitreous bond. That is, the final-formed bonded abrasive article can have a vitreous bond having a certain content of amorphous phase. In particular, the final-formed bonded abrasive article of embodiments herein can have a bond material that consists essentially of an amorphous phase. It will be appreciated that certain other embodiments can have a bond material that includes some content of a crystalline phase, which can be present in minor amounts (less than about 50 vol %).

In particular instances, the bond material powder can include inorganic materials, such as oxides. Notably, the bond material powder can include a frit material that is suitable for forming the final-formed vitreous bond material. A frit material can include a powder material formed form a glass, which is formed by firing initially to an elevated temperature (e.g., 1000° C. or greater), cooling, crushing and sizing to yield a powdered material ("a frit"). The frit then may be melted at a temperature well below the initial firing temperature used to make the glass from the raw materials, such as silica and clays.

The following paragraphs denote certain contents and certain compositions, which may be used in the bond material powder. It will be appreciated that reference herein to the particular amounts of certain compositions in forming the mixture may not necessarily form a final bond composition in the final-formed abrasive article having the exact same content of each of the species noted. In fact, typically during the forming process, the content of certain species can change such that the final-formed bonded abrasive may not necessarily contain the same amounts of certain species as was initially included in the bond material powder of the initial mixture.

Embodiments herein can utilize a bond material powder having a frit material. Frit material may be formed from oxides such as silica, alkalia oxide compounds, alkaline earth oxide compounds, and a combination thereof. The frit material facilitates suitable forming of a vitrified bond material in the final-formed bonded abrasive. According to one embodiment, the bond material powder can include a certain content of silica ($SiO_2$). For example, embodiments herein may utilize a bond material powder formed from at least about 50 mol % silica. In other embodiments, the amount of silica can be greater, such as at least about 52 mol %, such as at least about 55 mol %, and particularly within a range between about 50 mol % and about 70 mol % silica, such as between about 55 mol % and about 70 mol %.

The frit material may also contain a particular content of spinel forming materials, including for example, magnesium oxide, iron oxide, zinc oxide, chromium oxide, and aluminum oxide. Provision of a frit material having one or more spinel forming materials may facilitate formation of a first liquid phase during the forming process that is enriched with spinel forming materials, such that one of the initial compositions formed during formation of the bond material is a spinel material.

Additionally, the final-formed bond material can be formed from a bond material powder having a certain content of alkali oxide compounds. Alkali oxide compounds are oxide compounds and complexes utilizing alkali species denoted as Group 1A elements in the Periodic Table, such as lithium oxide ($Li_2O$), potassium oxide ($K_2O$), sodium oxide ($Na_2O$), cesium oxide ($Cs_2O$), and a combination thereof.

In accordance with one embodiment, the bond material powder can be formed from not greater than about 14 mol % total alkali oxide compounds. In other instances, the bond material powder is formed from less alkali oxide compounds, such as on the order of not greater than about 13 mol %, not greater than about 12 mol %, or even not greater than about 11 mol %. Particular embodiments herein may form a bond material powder having a total content of alkali oxide compounds within a range between about 5.0 mol % and about 14 mol %.

The bond material powder can contain a particularly low content of lithium oxide, which may be more prevalent in certain low-temperature bond compositions. For example, in certain embodiments, the bond material powder can be formed from less than 3.0 mol % lithium oxide, less than about 2.0 mol % lithium oxide, and even less than about 1.0 mol % lithium oxide. In fact, in certain instances, the bond material powder can be essentially free of lithium oxide.

The bond material powder can be formed from a particular content of sodium oxide. For example, in certain embodiments, the bond material powder can be formed from less than 3.0 mol % sodium oxide, less than about 2.0 mol % sodium oxide, and even less than about 1.0 mol % sodium oxide. In fact, in certain instances, the bond material powder can be essentially free of sodium oxide.

The bond material powder can be formed from a particular content of potassium oxide, such as a content of potassium oxide that is greater than a content of any other alkali oxide material. In fact, certain bond material powder compositions may contains only potassium oxide as the single alkali oxide compound material, excluding trace amounts (e.g., less than about 0.1 mol %) of other alkali oxide compounds. The bond material powder can include at least about 2.0 mol %, such as at least about 5.0 mol %, at least about 10 mol %, and particularly between about 2.0 mol % and about 15 mol % potassium oxide.

The final vitreous bond material can be formed from a bond material powder, which can be formed from a certain content of alkaline earth oxide compounds. Alkaline earth oxide compounds are oxide compounds and complexes incorporating divalent species from the alkaline earth elements present in Group 2A of the Periodic Table of Elements. That is, for example, suitable alkaline earth oxide compounds can include magnesium oxide (MgO), calcium oxide (CaO), strontium oxide (SrO), barium oxide (BaO), and a combination thereof. In accordance with one embodiment, the bond material powder used can be formed from at least about 5.0 mol % total alkaline earth oxide compounds. In other instances, the content of alkaline earth oxide compounds is greater, such as on the order of at least about 8.0 mol %, at least about 10 mol %, at least about 12 mol % or even at least about 15 mol %. Particular embodiments herein may utilize a total content of alkaline earth oxide compounds within a range between about 5.0 mol % and about 30 mol %, such as between about 5.0 mol % and about 25 mol %.

Of the alkaline earth oxide compounds present in the bond material powder, magnesium oxide may be present in the greatest content as compared to the other alkaline earth oxide compounds. The content of magnesium oxide may be used in greater amounts than other alkaline earth oxide compounds, and particularly a sufficient amount to facilitate the formation of a spinel material surrounding the abrasive grains. For example, a sufficient amount of magnesium oxide within the bond material powder can include at least about 5.0 mol %, such as at least 8.0 mol %, at least about 10 mol %, at least about 12 mol %, or even at least about 15 mol % magnesium oxide. In certain mixtures, the bond material powder can contain between about 5.0 mol % and 25 mol %, such as between about 10 mol % and about 20 mol %, or even between about 12 mol % and about 18 mol % magnesium oxide. It will be noted that another means of determining a sufficient amount includes measuring the thickness of a layer of spinel material formed in the final vitreous bond, which will be described herein.

The bond material powder can include a certain content of calcium oxide. For example, embodiments herein may utilize a bond material powder formed from not greater than about 5.0 mol % calcium oxide, such as not greater than about 3.0 mol %, not greater than about 2.0 mol %, or even not greater than about 1.0 mol % calcium oxide. Particular mixes of the bond material powder can be formed from between about 0.01 mol % and about 5.0 mol %, such as between about 0.05 mol % and about 3.0 mol %, and even between about 0.05 mol % and about 1.0 mol % calcium oxide. In some cases, the bond material powder can be essentially free of calcium oxide.

The amount of barium oxide within the bond material powder can be limited, and particularly less than the content of magnesium oxide and/or calcium oxide. For example, embodiments herein may utilize a bond material powder formed from not greater than about 5.0 mol % barium oxide, such as not greater than about 3.0 mol %, not greater than about 2.0 mol %, or even not greater than about 1.0 mol % barium oxide. Notably, bond material powder can be formed from between about 0.01 mol % and about 5.0 mol %, such as between about 0.05 mol % and about 3.0 mol %, and even between about 0.05 mol % and about 1 mol % barium oxide. In some cases, the bond material powder can be essentially free of barium oxide.

According to embodiments herein, the final vitreous bond material can be formed from a bond material powder, which can be formed to have a particular content of alumina ($Al_2O_3$). Notably, the bond material powder can be formed from particular contents of alumina (i.e., free alumina in powder form), which may facilitate the reaction and formation of a spinel material at the interface of the abrasive grains, which may contain MCA (i.e., a high content of alumina) and bond material in the formation of the final abrasive article. For example, embodiments herein may utilize a bond material powder formed from not greater than about 25 mol % alumina, such as on the order of not greater than about 20 mol % alumina, not greater than about 15 mol % alumina, not greater than about 12 mol % alumina, not greater than about 10 mol % alumina, such not greater than about 8.0 mol % alumina, not greater than about 6.0 mol % alumina, not greater than about 5.0 mol %, not greater than about 3.0 mol %, or even not greater than about 1.0 mol % alumina. Still, certain mixtures can utilize a bond material powder formed from a content of alumina within a range between about 1.0 mol % and about 25 mol %, such as between about 1.0 mol % and about 20 mol %, between about 1.0 mol % and about 15 mol %, between about 3.0 mol % and about 15 mol % alumina, and even between about 3.0 mol % and about 10 mol %. Particular bond material powders can be essentially free of alumina.

In addition to the oxide species noted above, the final vitreous bond may be formed from a bond material powder having a particular content of phosphorous oxide ($P_2O_5$), which may be a particularly small amount compared to certain low-temperature bond compositions. For example, the bond material powder can be formed from less than 1.0 mol % phosphorous oxide. In other embodiments, the bond material powder can be formed from less than about 0.5 mol % phosphorous oxide. In particular instances, the bond material powder can be formed such that it is essentially free of phosphorous oxide.

Additionally, the bond material powder can be formed from particular contents of boron oxide ($B_2O_3$). For example, the bond material powder may be formed from at least about 5.0 mol %, at least about 8.0 mol %, at least about 10 mol %, at least about 12 mol %, or even at least about 15 mol % boron oxide. In certain instances, the bond material powder can be formed from between about 5.0 mol % and about 25 mol %, such as between about 5.0 mol % and 20 mol % boron oxide.

In addition to certain species noted above, (e.g., magnesium oxide) additional metal oxide compounds can be added to the mixture to facilitate the formation of a spinel material within the final abrasive article, otherwise referred to as additional spinel-forming compounds. Some suitable additional spinel-forming compounds can include transition metal oxide compounds, and may particularly include zinc oxide, iron oxide, manganese oxide, chromium oxide, and a combination thereof. The presence of such additional spinel-forming compounds can be in amounts sufficient to form the spinel material. For example, the bond material powder can be formed from at least about 1.0 mol %, at least about 2.0 mol %, at least about 5.0 mol %, at least about 10 mol %, at least about 15 mol %, or even at least about 18 mol % of the additional spinel-forming compounds. Notably, such amounts may represent the total amount of a single additional spinel-forming compound, or a totality of a combination of different additional spinel-forming compounds. Particular bond material powder compositions can be formed from between about 1.0 mol % and about 30 mol %, such as between about 2.0 mol % and about 25 mol %, between about 2.0 mol % and about 20 mol %, and even between about 2.0 mol % and about 10 mol % of one or more additional spinel-forming compounds in total.

After making a mixture of abrasive grains and bond material powder, it will be appreciated, that other materials may be added to the mixture. For example, certain organic compounds may be added to the mixture such as binders and the like to facilitate formation of the article. In accordance with one particular embodiment, the mixture can contain a certain content of polyethylene glycol, animal glue, dextrin, maleic acid, latex, wax emulsion, PVA, CMC, and other organic and/or inorganic binder.

Additionally, other additives may be provided within the mixture to facilitate formation of the final-formed bonded abrasive article. For example, some suitable additives can include pore formers including, but not limited to, hollow glass beads, ground walnut shells, beads of plastic material or organic compounds, foamed glass particles and bubble alumina, elongated grains, fibers and combinations thereof.

After forming the mixture at step 101, the process can continue at step 103 by forming the mixture to form a green article. A green article is reference to an unfinished article which may not be thoroughly heat treated to complete densification (i.e. fully sintered). In accordance with one embodiment, the process of forming the mixture can include a pressing operation wherein the mixture is pressed into a particular shape similar to the shape of the intended final-formed bonded abrasive article. A pressing operation may be conducted as a cold pressing operation. Suitable pressures can be within a range between about 10 and about 300 tons.

After suitably forming the mixture at step 103, the process can continue at step 105 by treating the green body to form an abrasive article comprising abrasive grains in a bond material, wherein during treating a passivation region comprising a spinel material is formed around the abrasive grains. The process of treating can include heating the green article to a firing temperature of at least about 800° C. to form the abrasive article. Firing is generally carried out at a temperature suitable to form a vitrified bond material. In certain instances, the firing temperature can be greater, such as at least about 825° C., at least about 850° C., at least about 875° C., at least about 900° C., at least about 910° C., at least about 950° C., at least about 1100° C., at least about 1150° C., at least 1200° C., at least about 1250° C., or even at least about 1300° C. The firing temperature used to form the bonded abrasive articles of embodiments herein can be within a range between about 800° C. and about 1400° C., such as within a range between about 800° C. and about 1300° C., such as within a range between about 900° C. and about 1300° C., or even between 1000° C. and about 1300° C.

Generally, firing can be carried out in an ambient atmosphere, such that is contains air. Generally, the duration of peak temperature for firing can be at least about 1 hour, and particularly within a range between about 1 to 10 hours. After sufficiently heating the article to form a bonded abrasive article having abrasive grains contained within a vitreous bond material, the article can be cooled. Embodiments herein may utilize a natural cooling process wherein the power to the furnace is turned off and the article is allowed to cool from the firing temperature to room temperature naturally.

The bonded abrasive articles of embodiments herein can include abrasive grains contained within a bond material, wherein the bond material is a vitreous material having an amorphous phase. It is noted that particular contents of certain compositions (e.g. alkali oxide compounds, silica, alumina, boron oxide, etc), can change during the high temperature forming process such that the final-formed bonded abrasive article has a different content of such compositions as compared to the content of such compositions within the initial mixture. Accordingly, the bonded abrasive articles of embodiments herein are formed such that the final bond material of the abrasive article has certain contents of certain components and more particularly ratios of certain components such that the bonded abrasive article can be formed to have a spinel material, which can reduce degradation and/or dissolution of the microcrystalline alumina abrasive grains.

We now refer to certain aspects of the vitreous bond material in the final-formed abrasive article. As will be appreciated, the bond material of the final-formed abrasive article can contain a significant amount of silica. In accordance with one embodiment, the final-formed bond material can contain at least about 45 mol % silica, such as at least about 50 mol % silica, at least about 52 mol % silica. Still, in certain embodiments, the bond material can have between about 45 mol % and about 65 mol % silica, and more particularly between about 50 mol % and about 60 mol % silica.

The final-formed bond material of embodiments herein can have a particular content of boron oxide. For example, the final-formed bond material can have at least about 5.0 mol % boron oxide. In other instances, the bond material can contain at least about 10 mol %, such as at least about 15 mol % boron oxide. In certain embodiments, the bond material has a content of boron oxide within a range between about 5.0 mol % and about 25 mol %, such as between about 5.0 mol % and about 20 mol %, or even between about 10 mol % and about 18 mol %.

The abrasive articles of embodiments herein can have a total content of alkali oxide compounds within the bond material of the final-formed abrasive that facilitates a bonded abrasive article formed at high temperatures employing MCA grains with high integrity. That is, the total amount of alkali oxide compounds [Caoc] within the final bond material can be not greater than about 20 mol %. In particular, the total content of alkali oxide compounds can be not greater than about 18 mol %, not greater than about 15 mol %, not greater than about 12 mol %, or even not greater than about 10 mol %. In certain instances, the abrasive articles herein are formed such that the bond material has a total content of alkali oxide compounds within a range between about 2.0 mol % and about 20 mol %, such as between about 4.0 mol % and about 18 mol %, and even between about 6.0 mol % and about 15 mol %.

As noted above, the initial mixture of the bond material powder used to form the final vitreous bond material can contain particularly low amounts of certain alkali oxide compounds such as lithium oxide and sodium oxide. As such, the vitreous bond material of the abrasive article can have less than about 2.0 mol % lithium oxide, such as less than 1.5 mol %, such as less than 1.0 mol %, or even less than 0.5 mol % lithium oxide. Notably, in particular embodiments the final-formed bond material of the abrasive article can be essentially free of lithium oxide. Likewise, the bond material of the abrasive article can have less than about 2.0 mol % sodium oxide, such as less than 1.5 mol %, such as less than 1.0 mol %, or even less than 0.5 mol % sodium oxide. Notably, in particular embodiments the final-formed bond material of the abrasive article can be essentially free of sodium oxide. In those embodiments utilizing particularly low amounts of sodium oxide and lithium oxide, the amount of potassium oxide may account for significantly all of the alkali oxide compounds present within the bond material.

Additionally, the final-formed bond material may contain a certain content of alkaline earth oxide compounds [Caeoc]. In particular instances, the abrasive article can be formed such that the bond material can contain at least about 5.0 mol %, such as at least about 8.0 mol %, at least about 10 mol %, at least about 12 mol %, or even at least about 15 mol % alkaline earth oxide compounds. According to certain embodiments, the bond material can have a total content of alkaline earth oxide compounds between about 5.0 mol % and about 50 mol %, between about 10 mol % and about 50 mol %, and even between about 15 mol % and about 45 mol % alkaline earth oxide compounds.

In addition to the total content of alkaline earth oxide compounds, the final vitreous bond material may utilize a particular ratio between the total content of alkali oxide compounds (in mol %) and alkaline earth oxide compounds (in mol %) expressed as [Caeoc/Caoc] that can have a value of less than about 1.0. In other embodiments, this ratio can be less than about 0.9, such as at least about 0.85, less than about 0.8, or even less than about 0.75. Still, the ratio [Caeoc/Caoc] can be within a range between about 0.25 and about 1.0, such as between about 0.3 and about 0.9, such as between about 0.4 and about 0.9, such as between about 0.4 and about 0.85, and even between about 0.4 and about 0.8.

According to particular embodiments herein, the bond material is formed from a sufficient amount of magnesium oxide to form a spinel material within the final-formed abrasive article. In certain abrasive articles, the bond material can have a greater amount of magnesium oxide than any other alkaline earth oxide compound. In fact, in more particular embodiments, the bond material comprises an amount of magnesium oxide that is at least about 2 times greater than an amount of any other alkaline earth oxide compound within the bond. Still, in other embodiments, the bond material can have an amount of magnesium oxide that is at least about 5 times greater, such as at least about 8 times greater, at least about 10 times greater, or even at least about 12 times greater than an amount of any other alkaline earth oxide compound.

In alternate terms, the final-formed abrasive article can include a bond material having at least about 1.0 mol % magnesium oxide. Other embodiments can utilize a greater amount of magnesium oxide within the bond material, such as on the order of at least about 3.0 mol %, at least about 5.0 mol %, at least about 10 mol %, at least about 15 mol %, at least about 20 mol %, or even at least about 25 mol %. Particular embodiments have a bond material of the final-formed abrasive article having a magnesium oxide content within a range between about 1.0 mol % and about 50 mol %, such as between about 1.0 mol % and about 40 mol %, between about 1.0 mol % and about 30 mol %, between about 3.0 mol % and about 30 mol %, between about 3.0 mol % and about 25 mol %, or even between about 5.0 mol % and about 20 mol %.

In addition to the magnesium oxide content, the bond material of the final-formed abrasive article may contain particular amounts of other additional spinel-forming compounds useful in forming the spinel material in the bond. Such suitable spinel-forming additive materials (excluding magnesium oxide) can include zinc oxide, iron oxide, manganese oxide, chromium oxide, and a combination thereof. According to one embodiment, the bond material of the final-formed abrasive article can include at least about 0.1 mol % of any one of (or a combination of) the spinel forming additive material(s). In other embodiments, the amount of any one of or a combination of spinel-forming additive material(s) can be present in an amount of at least about 0.5 mol %, at least about 1.0 mol %, at least about 2.0 mol %, at least about 3.0 mol %, at least about 5.0 mol %, at least about 8.0 mol %, at least about 10 mol %, at least about 12 mol %, at least about 15 mol %, or even at least about 20 mol %. Particular bond materials in the final-formed abrasive article can include between about 0.1 mol % and about 35 mol %, such as between about 0.5 mol % and about 30 mol %, such as between about 0.5 mol % and about 25 mol %, between about 0.5 mol % and about 10 mol %, or even between 0.5 mol % and about 5.0 mol % of any one of or a combination of the spinel-forming additive material(s). It will be appreciated that the content of the spinel-forming materials, including magnesium oxide, within the final bond material may be particularly lower than initial amounts, since the material may be part of a spinel material.

In particular bond compositions, the bond material of the final-formed abrasive article contains at least about 0.1 mol % zinc oxide. In other instances, the amount of zinc oxide can be greater, such as at least about 1.0 mol %, at least about 2.0 mol %, at least about 3.0 mol %, or even at least about 5.0 mol %. Certain bond compositions can have between about 0.5 mol % and about 3.0 mol %, and more particularly between about 1.0 mol % and about 3.0 mol % zinc oxide. Still, according to an alternative embodiment, the abrasive article is formed such that the bond material has the same amount of zinc oxide and magnesium oxide. Certain bond compositions can also contain the same amount of iron oxide, manganese oxide, and/or chromium oxide.

Additionally, the final-formed bond material can contain a specific content of calcium oxide, particularly an amount that may be less than the content of magnesium oxide. For example, the final-formed bond material can contain less than about 3.0 mol % calcium oxide, such as less than about 2.0 mol % calcium oxide, or even less than about 1.0 mol % calcium oxide. In certain embodiments, the final-formed bond material can be essentially free of calcium oxide. Also, the amount of barium oxide within the final-formed bond material can be the same as those value ranges noted above for calcium oxide. Moreover, the final-formed bond material can contain an amount of barium oxide of less than about 2.0 mol %, such as less than about 1.0 mol %, and particularly within a range between about 0.1 and about 1.0 mol %. Certain bond materials can be essentially free of barium oxide.

The bond may contain minor amounts of other materials, particularly oxide compounds, such as phosphorous oxide. For example, the final-formed bond material can have less than about 1.0 mol % of phosphorous oxide, such as less than about 0.5 mol % phosphorous oxide. In particular, the final-formed bond material of the abrasive article can be essentially free of phosphorous oxide.

The spinel material of the embodiments herein can be formed within the bond material, and may reduce the dissolution and degradation of the MCA abrasive grains during forming of the abrasive article. The spinel material can generally have a cubic lattice structure and be represented by the general formula $AB_2O_4$, wherein A is an element selected from the group consisting of magnesium, zinc, manganese, iron, and a combination thereof, wherein B is an element selected from the group consisting of aluminum, chromium, iron, and a combination thereof, and O is oxygen. In certain instances, the spinel material is formed such that it substantially comprises the composition $MgAl_2O_4$. In fact, the spinel material within the bond material of the final-formed abrasive article for certain embodiments can consist essentially of $MgAl_2O_4$.

Still, in other embodiments, the spinel material can be a solid solution having a composition as described by the formula $(Mg^{2+}, Zn^{2+}, Fe^{2+}, Mn^{2+})(Al^{3+}, Fe^{3+}, Cr^+)_2O_4$. In certain other embodiments, the spinel material can have less elemental substitutions for the B-type elements (i.e., trivalent species), such that the material is a solid solution described by the formula $(Mg^{2+}, Zn^{2+}, Fe^{2+}, Mn^{2+})(Al^{3+})_2O_4$, wherein aluminum is substantially the only trivalent species within the spinel material. In fact, in particular instances, the spinel material can be formed such that the trivalent species consist essentially of only aluminum. Alternatively, the solid solution spinel material can have the composition $(Mg^{2+}, Zn^{2+}, Fe^{2+}, Mn^{2+})(Fe^{3+})_2O_4$, such that essentially all of the trivalent species present within the material are iron. In another embodiment, the spinel material can be described by the composition of $(Mg^{2+}, Zn^{2+}, Fe^{2+}, Mn^{2+})(Cr^{3+})_2O_4$, wherein essentially all of the trivalent species present within the material are chromium. Still, it will be appreciated that certain spinel materials can utilize a mixture of elements including aluminum, chromium, and iron. Within such spinel materials, some embodiments are contemplated wherein aluminum accounts for a majority content of the trivalent species, and in certain embodiments aluminum accounts for a substantial amount, such as on the order of at least about 75%, at least about 80%, at least about 90%, or more. As such, according to the foregoing spinel materials, iron and chromium may be present in minor amounts (e.g., less than about 10% of each of iron and chromium).

In yet other embodiments, the spinel material can be a solid solution material having the general composition represented by the formula $(Mg^{2+}, Zn^{2+}, Fe^{2+})(Al^{3+}, Fe^{3+}, Cr^{3+})_2O_4$, wherein the A-type elements representing the divalent species within the material can include a combination of different elements including magnesium, zinc, iron, and a combination thereof. In certain embodiments, the magnesium may be present in a greater amount than zinc and/or iron. For example, the magnesium may be present within the solid solution in a majority amount as compared to elements $Zn^{2+}$ and $Mn^{2+}$. In fact, certain spinel materials may utilize an amount of magnesium that is at least about 75%, such as on the order of at least about 80%, at least about 85%, at least about 90%, at least about 95%, or even at least about 98% of all divalent species within the composition.

Other spinel materials can have a composition described by the formula $(Mg^{2+}, Zn^{2+})(Al^{3+}, Fe^{3+}, Cr^{3+})_2O_4$, wherein the A-type elements include either magnesium or zinc, and the composition is substantially free of iron. In still other embodiments, the composition can be described as $(Mg^{2+}, Fe^{2+})(Al^{3+}, Fe^{3+}, Cr^{3+})_2O_4$, wherein the A-type divalent species can include either magnesium or iron, and the composition is substantially free of zinc.

According to one particular embodiment, the spinel composition utilizes only magnesium as the A-type divalent species, described by the formula $(Mg^{2+})(Al^{3+}, Fe^{3+}, Cr^{3+})_2O_4$. Notably, for certain spinel compositions, the solid solution spinel material can have a composition including fewer trivalent species as well, and can include compositions such as $(Mg^{2+})(Al^{3+}, Fe^{3+})_2O_4$, which is substantially free of chromium, or alternatively, a composition described as $(Mg^{2+})(Al^{3+}, Cr^{3+})_2O_4$, which is substantially free of iron.

The spinel material can be present as a passivation region within the bond material. A passivation region includes reference to a region within the bond material that may have a particularly high concentration of spinel material as opposed to other regions within the abrasive article. It should be noted that certain passivation regions may not necessarily be separately identifiable structures between the bond material and the abrasive grains, such as discrete layers or films. The term passivation region is a general term that includes a discontinuous region of material, which can be of a different composition or phase than the bond material, which surrounds the abrasive grains, or alternatively, a continuous region, such as a layer of material, extending along the exterior of the abrasive grains, and thus surrounding the abrasive grains. The passivation region comprising the spinel material can be preferentially disposed around at least a portion of the abrasive grains, and more particularly, adjacent to and surrounding abrasive grains comprising microcrystalline alumina. In particular, the passivation region having the spinel material can be primarily within the bond material and preferentially disposed at the interface between the abrasive grains and the bond material. The passivation region may be disposed at a position adjacent to the abrasive grains, but may not necessarily be bonded to the abrasive grains. In fact, the passivation region in certain instances may consist essentially of the spinel material.

The passivation region may be formed such that it extends along a portion of the abrasive grains, particularly along the exterior regions of the abrasive grains. The passivation region can surround a majority of the abrasive grains within the abrasive article. In fact, the passivation region can surround at least about 60%, at least about 75%, at least about 80%, at least about 90% or essentially all of the abrasive grains contained within the abrasive article.

Notably, in certain embodiments, the abrasive article can incorporate more than one type of abrasive grain. That is, for example, the abrasive article can be formed of abrasive grains comprising MCA and abrasive grains made of a superabrasive material, monocrystalline alumina, or any of the other secondary type of abrasive grain materials noted herein. In such embodiments, the abrasive article can be formed such that the passivation region is preferentially disposed around the abrasive grains comprising the MCA, and particularly surrounding only the abrasive grains of MCA. In such embodiments, the passivation region comprising spinel material may not necessarily be disposed around (i.e., surrounding) the secondary abrasive grain material. Therefore, in certain designs, the abrasive article includes abrasive grains of MCA wherein the passivation region is selectively disposed around (e.g., at the interface of the abrasive grains and bond material) the abrasive grains of MCA, and still, the passivation region is spaced apart from the second set of abrasive grains, such that the second set of abrasive grains are substantially free of a passivation region or layer comprising the spinel material.

According to certain embodiments, the spinel material may actually be present as an observable, discrete layer of material overlying at least a portion of the grains. That is, a discrete layer comprising spinel material can be disposed at and overlying the exterior surfaces of the abrasive grains. In particular abrasive articles, the layer can be in direct contact with the abrasive grains. In more particular instances, the layer comprising the spinel material can be bonded directly to the abrasive grains. Additionally, the layer comprising the spinel material can be bonded directly to the bond material.

The layer can have the same attributes as the passivation region, particularly with regard to percentage of coverage of the total amount of abrasive grains within the abrasive article. Moreover, the layer can be a discrete, identifiable region at the interface between the abrasive grains and the bond material, such that the layer has a discrete microstructure from the bond material and the abrasive grains. In such instances, the layer can overlie at least a fraction of the total exterior surface of the abrasive grains, such as at least about 25%, at least about 40%, or even a majority of the total exterior surface of the abrasive grains. Still, the degree of coverage of the layer of spinel material of the exterior surface of the abrasive grains can be greater, such as at least about 75%, at least about 80% or even essentially the entire exterior surface of the abrasive grains.

The layer comprising the spinel material can have an average thickness suitable for reducing the degradation and/or dissolution of certain abrasive grains during formation. For example, the layer can have an average thickness of at least about 0.01 microns. In other instances, the layer can have an average thickness of at least about 0.1 microns, such as at least about 1 micron, at least about 2 microns, at least about 3 microns, or even at least about 4 microns. Still, the average thickness of the spinel layer can be within a range between about 0.01 microns and about 10 microns, such as between about 0.1 microns and about 5 microns.

Notably, for the embodiments herein utilizing the spinel material, the abrasive article is formed such that a majority of spinel material within the abrasive article is disposed within the passivation region or the layer. In particular instances, essentially all of the spinel material present within the abrasive article can be present within the passivation region or the layer.

Figure 2A:
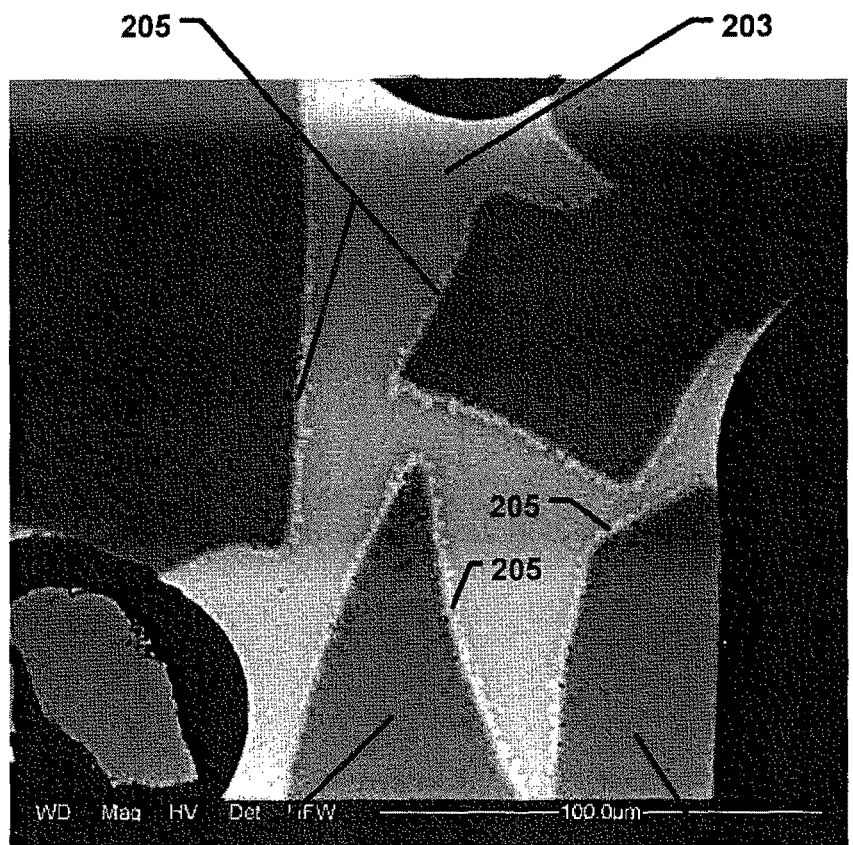
FIGS. 2A-2C include images of portions of an abrasive article having a layer of spinel material in accordance with embodiments.
Figure 2B:
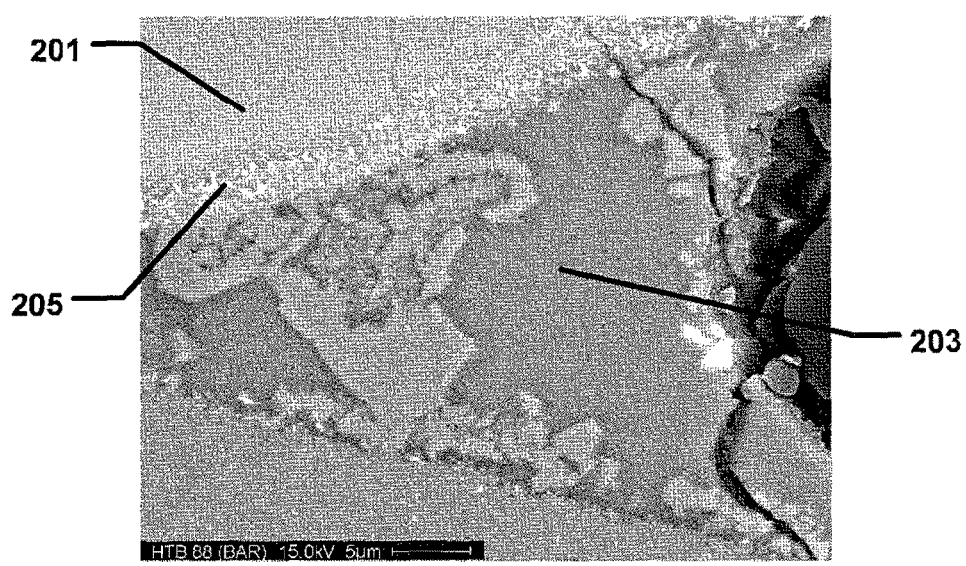
Figure 2C:
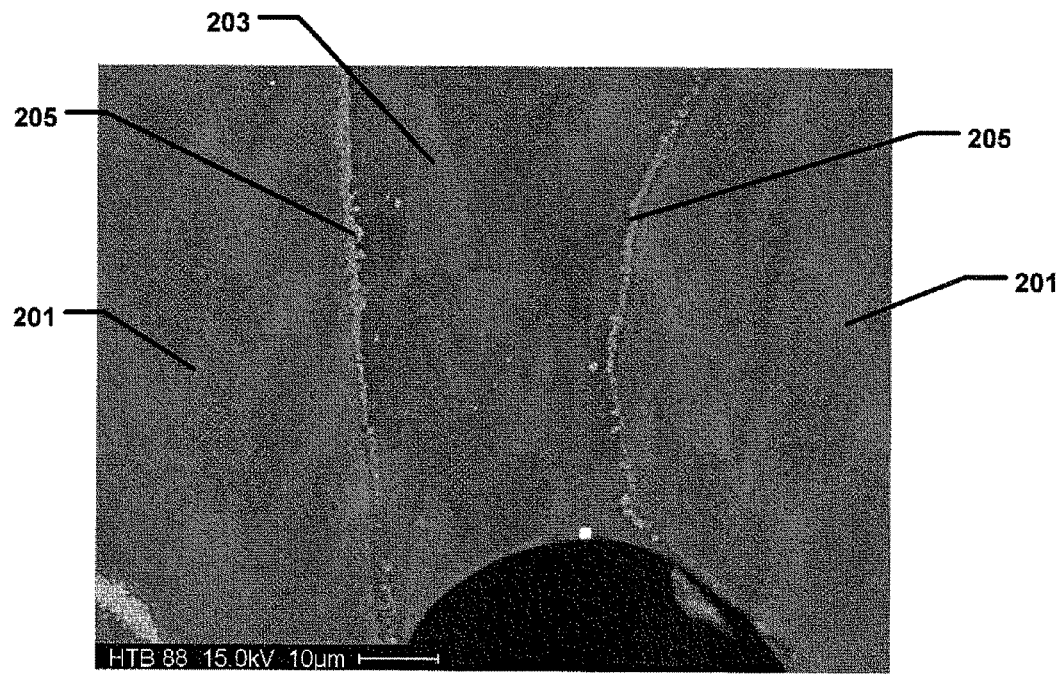

Referring briefly to FIGS. 2A-2C, scanning electron microscope images of portions of an abrasive article are provided demonstrating a passivation region having spinel, and more particularly, a layer of spinel material according to an embodiment. The image of FIG. 2A was taken at a magnification of approximately 700× to demonstrate the formation of a layer comprising spinel around the abrasive grains. The magnification of FIG. 2B was greater for a more focused view of the spinel layer surrounding the abrasive grain. As provided in FIG. 2A, the portion of the abrasive article includes abrasive grains 201 illustrated as the darkest portions contained within a bond material 203. As illustrated, the abrasive article comprises a layer of material 205 surrounding the abrasive grains 201 and positioned at the exterior surfaces of the abrasive grains 201 at the interface between the abrasive grains 201 and the bond material 203. The layer 205 comprises a spinel material that can prevent degradation and/or dissolution of the abrasive grains during forming. The layer 205 is illustrated as a discrete, identifiable layer that is in direct contact with the abrasive grains 201 and the bond material 203. More particularly, the layer 205 can be directly bonded to the abrasive grains 201 and the bond material 203.

FIG. 2B further illustrates the discrete nature of the layer 205 of spinel material disposed at the interface between the abrasive grain 201 and bond material 203. FIG. 2B further illustrates the thickness of the layer 205, having an average thickness within a range between about 3 to 4 microns.

FIG. 2C provides another magnified image of an abrasive article formed according to the embodiments herein, and demonstrates a layer 205, comprising the spinel material, disposed at the interface of the abrasive grains 201 and the bond material 203.

It will be appreciated that the abrasive grains can be formed to have particular features, such as a coating of material. The coating of material can include an inorganic material, such as an oxide. In such instances of abrasive grains utilizing a coating, the passivation region or layer comprising the spinel material can be disposed external to the coating, such as at the interface between the coating and the bond material.

The abrasive articles according to embodiments herein can contain a total abrasive grain content from about 34 vol % to about 56 vol %, such as between about 40 vol % and about 54 vol %, and particularly between about 44 vol % and about 52 vol % of the total volume of the abrasive article. The MCA abrasive can account for between about 1 to about 100 vol % of the total abrasive grain of the abrasive article, such as between about 10 vol % and about 80 vol %, or between 30 vol % and about 70 vol % of the total volume of abrasive grain in the abrasive article. Moreover, some abrasive articles can include 0.1 vol % to 60 vol % of one or more secondary abrasive grains, fillers and/or additives.

The abrasive articles of the embodiments herein can include between about 3 vol % and about 30 vol % bond material of the total volume of the abrasive article. In more particular instances, the abrasive article can contain between about 3 vol % to about 25 vol % bond, between about 4 vol % to about 20 vol % bond, and even between about 5 vol % to about 18.5 vol % bond.

While a majority of the abrasive tools can have various degrees of porosity, some of the abrasive bodies formed according to embodiments herein may exhibit a certain content of porosity. For example, the abrasive body can have a porosity that is less than about 50 vol % of the total volume of the abrasive article. In other instances, the porosity can be less than about 49 vol %, such as less than about 40 vol %. In particular instances, the abrasive bodies can be formed to have a porosity that is at least about 20 vol % and less than about 40 vol %, such as between about 30 vol % and about 50 vol %, and more particularly between about 30 vol % and about 49 vol %.

EXAMPLES

Example 1

Two samples were prepared, a first sample S1 formed according to embodiments herein and a second, conventional sample CS1 having a conventional bond material. The samples S1 and CS1 were tested under particular grinding conditions to compare their performance properties.

The S1 sample was formed by initially combining 80-90 wt % of abrasive grains with 9-15 wt % of an initial bond material having the composition provided in Table 1 below. The mixture further included a remainder amount (wt %) of other additives including a binder material. Sample S1 was initially cold pressed to form a green article, and thereafter sintered at a firing temperature of about 1000° C. to form a final bonded abrasive article having approximately 46-50 vol % abrasive grains, 7-12 vol % vitreous bond material, and a reminder amount of porosity. The initial and final composition of the bond material is provided in Table 1. The final composition was measured using microprobe analysis using an SX50 machine available from CAMECA Corporation.

TABLE 1

| Component | S1 Initial Composition (mol %) | S1 Final Composition (mol %) |
|---|---|---|
| SiO2 | 61.60 | 55.42 |
| Al2O3 | 0.06 | 13.39 |
| B2O3 | 13.87 | 17.22 |
| Li2O | 2.30 | 2.12 |
| Na2O | 2.36 | 3.04 |
| K2O | 2.35 | 2.56 |
| MgO | 14.97 | 5.52 |
| CaO | 0.07 | .019 |
| BaO | 0 | 0 |
| Fe2O3 | 0.02 | 0 |
| TiO2 | 0 | 0.05 |
| ZrO2 | 0 | 0.25 |
| ZnO | 2.41 | 0.25 |

The sample CS1 is formed according to the process of sample S1, but fired at a firing temperature between about 900° C.-950° C. Like sample S1, the sample CS1 was formed such that it also contained approximately 46-50 vol % abrasive grains, 7-12 vol % bond material, and a reminder amount of porosity.

The bond composition of the final-formed vitreous bond for the CS1 sample had approximately 45-52 mol % silica, 15-18 mol % alumina, a certain content of boron oxide, less than 20 mol % alkali oxide compounds including large amounts of lithium oxide, less than 2.0 mol % alkaline earth oxide compounds, and also including less than 1.5 mol % of MgO, ZnO, and $Fe_2O_3$. Notably, the final-formed vitreous bond of the CS1 sample had no spinel material.

The samples S1 and CS1 were subject to an internal diameter grinding operation to determine the power consumption of the bonded abrasive articles per grinding cycle and also the straightness of the samples S1 and CS1 after the grinding procedure. The grinding conditions are summarized in Table 2 below.

TABLE 2

| Parameters | Values |
|---|---|
| Work material type | 52100 bearing steel |
| Wheel speed (rpm) | 1250 |
| Work speed (m/sec) | 52 |
| Total material removed (m) | ~200 |
| Constant feed grinding mode Air, Rough 1, Rough 2, Fine (m/sec) | 300, 75, 60, 15 |
| Grind Width (mm) | ~14 mm |
| Dressing Depth ((m) | 10 |
| Dress Frequency | After 10 grinds |

Figure 3:
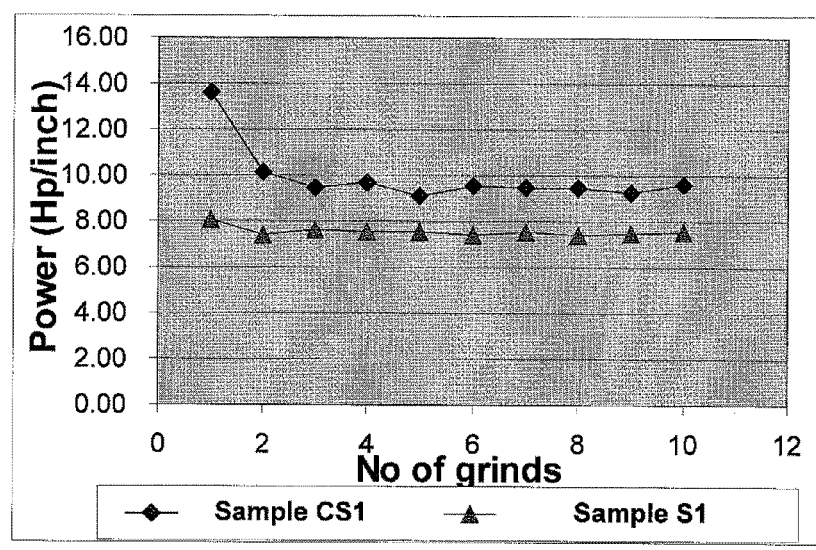
FIG. 3 includes a plot of average power consumption versus number of grinding cycles for a sample formed according to an embodiment and a conventional sample.
Figure 4:
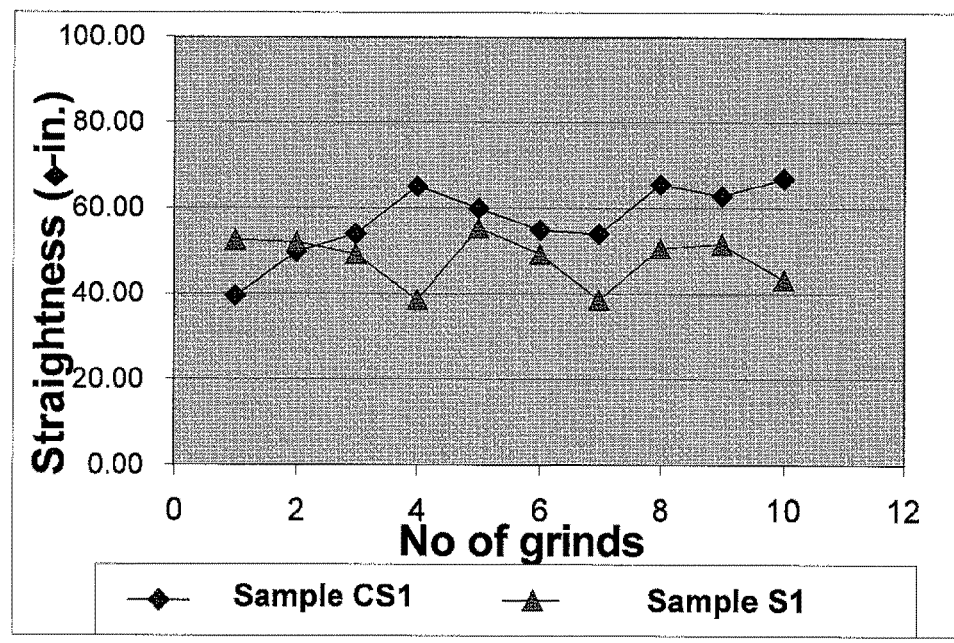
FIG. 4 includes a plot of straightness versus number of grinding cycles for a sample formed according to an embodiment and a conventional sample.

FIGS. 3 and 4 summarize the test results. FIG. 3 includes a plot of power versus number of grinding cycles for each of the samples (i.e., S1 and CS1). The data of FIG. 3 demonstrates that the sample S1 utilizes less power for all grinding cycles, and thus a lower average power consumption for each of the grinding cycles, suggesting that sample S1 has improved abrasive grain integrity as compared to sample CS1.

Additionally, FIG. 4 includes a plot of straightness versus number of grinding cycles, which is a measure of the linearity of the surface generated in the workpiece after the grinding operation by the bonded abrasive article. The straightness of the part generated can be related to the uniformity of wheel wear in the edges and the bulk regions. Straightness measurements are performed with the help of a round gage (Formscan 260 from Mahr Federal) and line profiles are generated along the surface of the workpiece. Four such measurements are made on each part and their average is reported as the value of straightness. This test method is according to the standard ASME Y14.5M "Dimensioning and Tolerancing." As illustrated, the sample S1 demonstrates less variation in the straightness as compared to sample CS1, and therefore more consistent grinding capabilities.

Example 2

Another sample (S2) was formed according to the methods of Sample S1 and having the same structure as Sample S1. Table 3 below summarizes the initial bond composition of the material components in mol %. After forming the bonded abrasive material according to the processes disclosed herein, the sample was sectioned and viewed under a magnification of 1200× to determine the nature of the passivation region.

TABLE 3

| Component | S2 Initial Composition (mol %) |
|---|---|
| SiO2 | 58.22 |
| Al2O3 | 5.54 |
| B2O3 | 13.11 |
| Li2O | 2.18 |
| Na2O | 2.22 |
| K2O | 2.22 |
| MgO | 14.14 |
| CaO | 0.07 |
| BaO | 0 |
| Fe2O3 | 0.02 |
| TiO2 | 0 |
| ZrO2 | 0 |
| ZnO | 2.27 |

Figure 5:
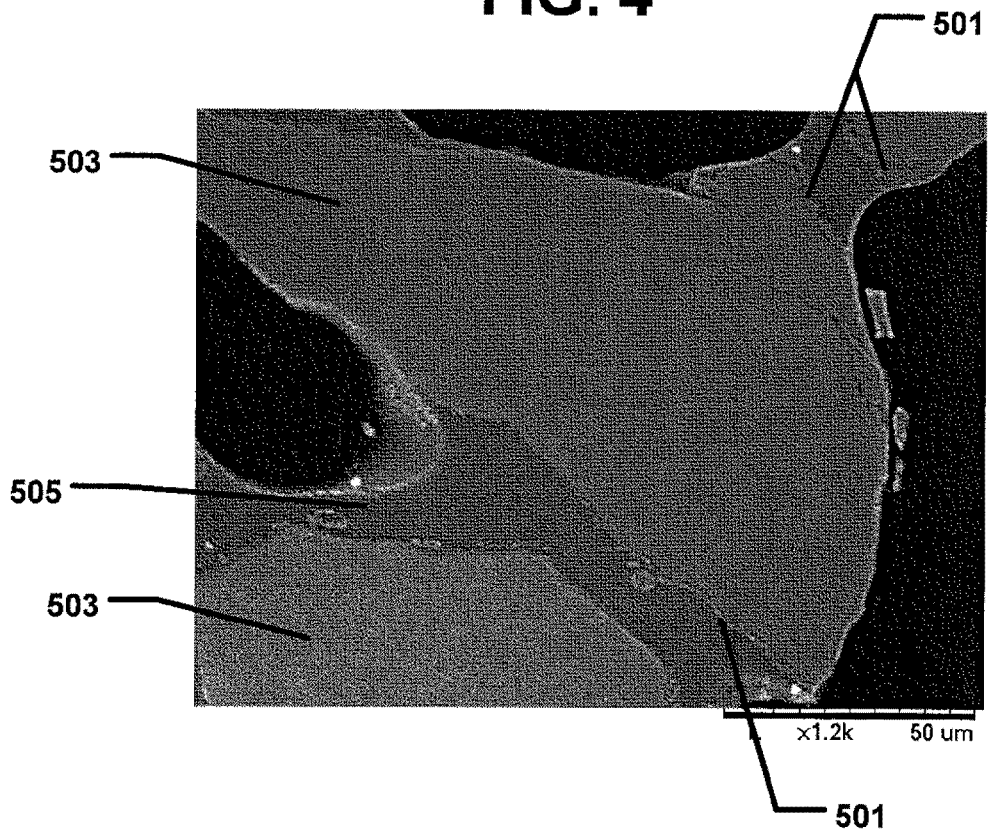
FIG. 5 includes a scanning electron microscope image of a portion of an abrasive article in accordance with an embodiment.

FIG. 5 includes an image of the sectioned Sample S2. As provided, the bonded abrasive of Sample S2 demonstrates a passivation region in the form of a discrete layer 501 overlying the abrasive grains 503. In fact, as illustrated, the layer 501 comprising the spinel material is a continuous region that extends along the exterior surface of the abrasive grains 503 between the abrasive grains 503 and the bond material 505. The layer 501 comprising the spinel material is illustrated as a discrete and separately identifiable phase within the microstructure of the bonded abrasive article.

Example 3

Another sample (S3) was formed according to the methods of Sample S1 and having the same structure as Sample S1. Table 4 below summarizes the initial bond composition of the material components in mol %.

TABLE 4

| Component | S2 Initial Composition (mol %) |
|---|---|
| $SiO_2$ | 57.64 |
| $Al_2O_3$ | 0.0 |
| $B_2O_3$ | 19.58 |
| $Li_2O$ | 2.21 |
| $Na_2O$ | 2.21 |
| $K_2O$ | 2.21 |
| MgO | 13.91 |
| CaO | 0.0 |
| BaO | 0.0 |
| $Fe_2O_3$ | 0.0 |
| $TiO_2$ | 0.0 |
| $ZrO_2$ | 0.0 |
| ZnO | 2.23 |

Figure 6:
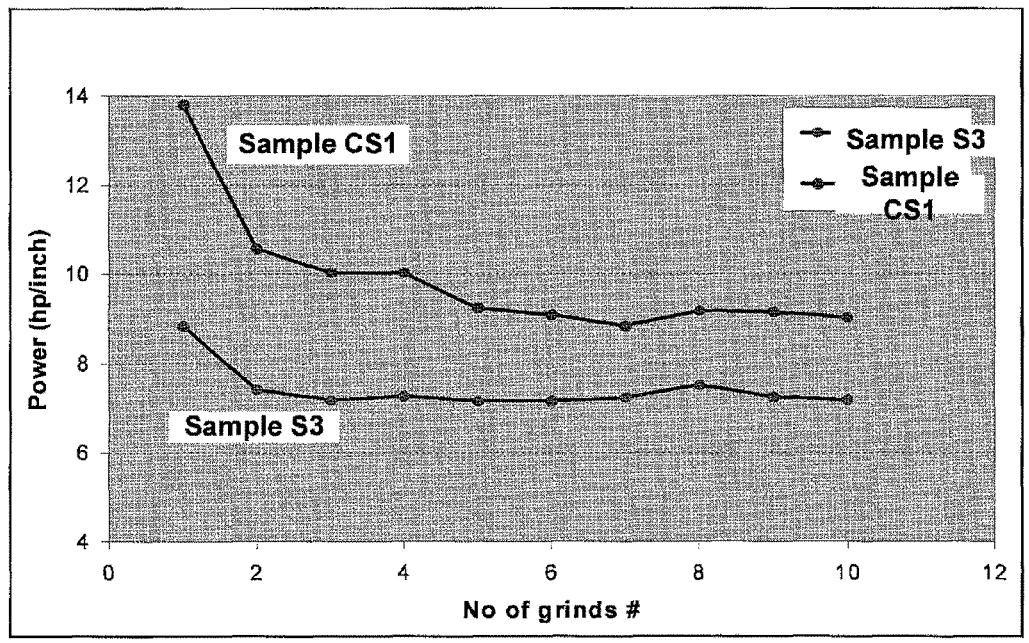
FIG. 6 includes a plot of average power consumption versus number of grinding cycles for a sample formed according to an embodiment and a conventional sample.
Figure 7:
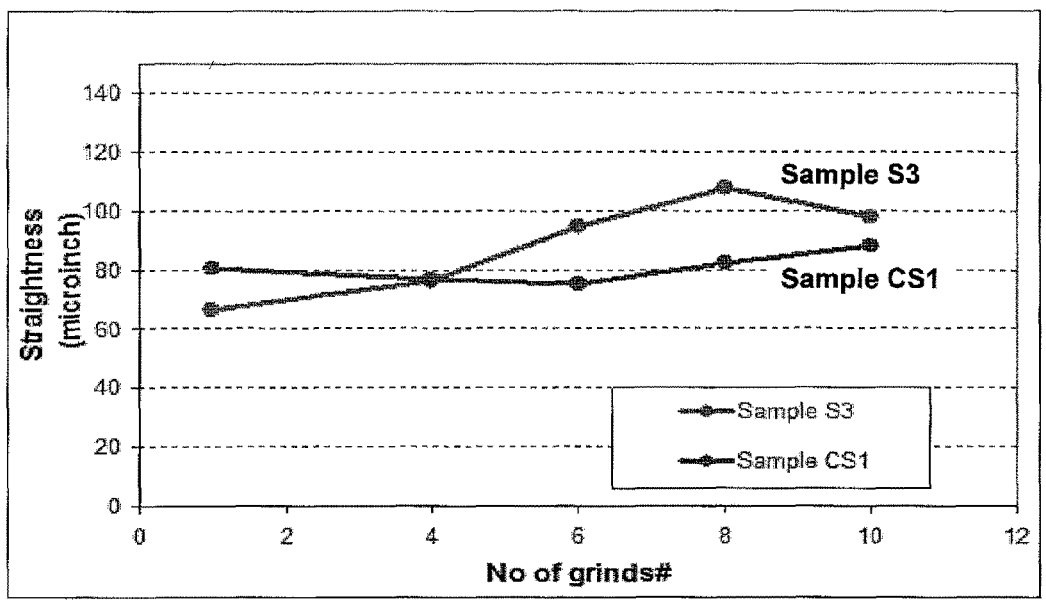
FIG. 7 includes a plot of straightness versus number of grinding cycles for a sample formed according to an embodiment and a conventional sample.

FIGS. 6 and 7 summarize grinding test results conducted using test samples formed from the body of sample S3. Sample S3 and the comparative sample CS1 were used to conduct a grinding operation as detailed in Example 1. FIG. 6 includes a plot of power versus number of grinding cycles for the sample S3 and the comparative sample CS1 of Example 1. The data presented in FIG. 6 demonstrates that sample S3 utilizes less power for all grinding cycles, and thus a lower average power consumption for each of the grinding cycles, showing that sample S3 has improved abrasive grain integrity as compared to sample CS1.

Additionally, FIG. 7 includes a plot of straightness versus number of grinding cycles for sample S3 and the conventional sample CS1 after conducting the grinding operation according to the test parameters set forth in Example 1. As noted above, the straightness of the part generated can be related to the uniformity of wheel wear in the edges and the bulk regions, and is measured according to the parameters described herein. Sample S3 demonstrates slightly greater variation in the straightness as compared to sample CS1, however, such values were achieved using significantly less power, thus indicating overall the improved performance of the samples as compared to the conventional sample.

The embodiments herein are directed to abrasive articles incorporating microcrystalline alumina grains in a high temperature bonded abrasive article, wherein the microcrystalline alumina grains exhibit improved integrity and minimized dissolution and degradation. Generally, the state-of-the-art bonded abrasive articles employing MCA grains have been directed to the formation and use of low temperature vitrified bonds formed at temperatures below 1000° C. However, the embodiments herein are directed to a bonded abrasive article formed to include a spinel material, disposed preferentially as a passivation region, or even a layer of material, proximate to (e.g., surrounding or overlying) the abrasive grains comprising MCA, and thereby minimizing dissolution and degradation of the MCA grains. The embodiments herein can utilize one or more combinations of features, including particular bond compositions, particular ratios of compounds within the bond, including but not limited to, ratios between the alkali oxide compounds and alkaline earth oxide compounds, ratio between silica and other components, ratio between boron oxide and other components, and the like. The foregoing describes a combination of features, which can be combined in various manners to describe and define the bonded abrasive articles of the embodiments. The description is not intended to set forth a hierarchy of features, but different features that can be combined in one or more manners to define the invention.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. An bonded abrasive article comprising:
an abrasive body including abrasive grains within a bond material comprising an amorphous phase, the abrasive body further including a passivation region comprising a spinel material, wherein the passivation region is within the bond material and surrounds a majority of the abrasive grains, wherein the abrasive grains comprise microcrystalline aluminum oxide and wherein the bond material comprises less than about 50 vol % of a crystalline phase.

2. The bonded abrasive article of claim 1, wherein the abrasive body comprises a porosity of at least about 20 vol % and less than about 40 vol % of the total volume of the abrasive article.

3. The bonded abrasive article of claim 1, wherein the passivation region consists essentially of a spinel material.

4. The bonded abrasive article of claim 1, wherein the bond material comprises at least about 5.0 mol % magnesium oxide.

5. The bonded abrasive article of claim 1, wherein the bond material consists essentially of an amorphous phase.

6. The bonded abrasive article of claim 1, wherein the bond material comprises boron oxide ($B_2O_3$).

7. The abrasive article of claim 6, wherein the bond material comprises between about 5 mol % and about 25 mol % boron oxide.

8. The bonded abrasive article of claim 1, wherein the bond material comprises an alkali oxide compound selected from the group of oxide compounds consisting of lithium oxide ($Li_2O$), potassium oxide ($K_2O$), sodium oxide ($Na_2O$), cesium oxide ($Cs_2O$), and a combination thereof.

9. The bonded abrasive article of claim 8, wherein the bond material comprises a total content of alkali oxide compounds [$C_{aoc}$] within a range between about 2 mol % and about 20 mol %.

10. The bonded abrasive article of claim 1, wherein the bond comprises an alkaline earth oxide compound selected from the group of materials consisting of magnesium oxide (MgO), calcium oxide (CaO), strontium oxide (SrO), barium oxide (BaO), and a combination thereof.

11. The bonded abrasive article of claim 10, wherein the bond comprises a total content of alkaline earth oxide compounds [Caeoc] within a range between about 5 mol % and about 50 mol %.

12. The bonded abrasive article of claim 1, wherein the spinel material is represented by the general equation $AB_2O_4$, wherein A is an element selected from the group consisting of magnesium, zinc, manganese, iron, and a combination thereof, wherein B is an element selected from the group consisting of aluminum, chromium, iron, and a combination thereof, and O is oxygen.

13. An bonded abrasive article comprising:
an abrasive body including abrasive grains contained within a matrix of bond material comprising an amorphous phase, the abrasive body further including a layer comprising a spinel material overlying an exterior surface of the abrasive grains, wherein the bond material comprises at least about 5.0 mol % magnesium oxide, wherein the abrasive grains comprise microcrystalline aluminum oxide and wherein the bond material comprises less than about 50 vol % of a crystalline phase.

14. The bonded abrasive article of claim 13, wherein the spinel material is represented by the general equation $AB_2O_4$, wherein A is an element selected from the group consisting of magnesium, zinc, manganese, iron, and a combination thereof, wherein B is an element selected from the group consisting of aluminum, chromium, iron, and a combination thereof, and O is oxygen.

15. The bonded abrasive article of claim 14, wherein the spinel material comprises $MgAl_2O_4$.

16. The bonded abrasive article of claim 14, wherein the spinel material comprises a solid solution described by the composition $(Mg^{2+}, Zn^{2+}, Fe^{2+}, Mn^{2+})(Al^{3+})_2O_4$.

17. The bonded abrasive article of claim 13, wherein the bond material comprises a total content of alkali oxide compounds [Caoc] and a total content of alkaline earth oxide compounds [Caeoc], and wherein the ratio of [Caeoc]/[Caoc] has a value of less than about 1.0.

18. The bonded abrasive article of claim 13, wherein the bond material comprises zinc oxide (ZnO).

19. An bonded abrasive article comprising:
an abrasive body including abrasive grains contained within a matrix of bond material comprising an amorphous phase, the abrasive body further including a layer comprising a spinel material overlying an exterior surface of the abrasive grains, wherein the bond material comprises an amount of magnesium oxide that is at least about 2 times greater than an amount of any other alkaline earth oxide compound, wherein the abrasive grains comprise microcrystalline aluminum oxide and wherein the bond material comprises less than about 50 vol % of a crystalline phase.

* * * * *

UNITED STATES PATENT AND TRADEMARK OFFICE
CERTIFICATE OF CORRECTION

PATENT NO. : 8,784,521 B2  
APPLICATION NO. : 12/959273  
DATED : July 22, 2014  
INVENTOR(S) : Gilles Querel et al.

Page 1 of 1

It is certified that error appears in the above-identified patent and that said Letters Patent is hereby corrected as shown below:

In the specification,

Column 4, Line 47, please delete "alkalia" and insert therefor -- alkali --

Column 15, TABLE 2, please delete "Total material removed (m)" and insert therefor -- Total material removed (μm) --

Column 15, TABLE 2, please delete "Constant feed grinding mode Air, Rough 1, Rough 2, Fine (m/sec)" and insert therefor -- Constant feed grinding mode Air, Rough 1, Rough 2, Fine (μm/sec) --

Column 15, TABLE 2, please delete "Dressing Depth (m)" and insert therefor -- Dressing Depth (μm) --

In the claims,

Column 18, Line 33, Claim 1, please delete "An" and insert therefor -- A --

Column 19, Line 17, Claim 13, please delete "An" and insert therefor -- A --

Column 20, Line 17, Claim 19, please delete "An" and insert therefor -- A --

Signed and Sealed this  
First Day of March, 2016

Michelle K. Lee  
*Director of the United States Patent and Trademark Office*